United States Patent
Tsirkin

(10) Patent No.: US 9,483,301 B2
(45) Date of Patent: Nov. 1, 2016

(54) DYNAMIC VIRTUAL MACHINE FUNCTION ENABLING

(71) Applicant: Red Hat Israel, Ltd., Ra'anana (IL)

(72) Inventor: Michael Tsirkin, Raanana (IL)

(73) Assignee: RED HAT ISRAEL, LTD., Ra'Anana (IL)

( * ) Notice: Subject to any disclaimer, the term of this patent is extended or adjusted under 35 U.S.C. 154(b) by 0 days.

(21) Appl. No.: 14/632,644

(22) Filed: Feb. 26, 2015

(65) Prior Publication Data

US 2016/0253193 A1 Sep. 1, 2016

(51) Int. Cl.
G06F 9/46 (2006.01)
G06F 9/455 (2006.01)
G06F 9/50 (2006.01)

(52) U.S. Cl.
CPC ......... *G06F 9/45558* (2013.01); *G06F 9/5011* (2013.01); *G06F 2009/45583* (2013.01)

(58) Field of Classification Search
CPC .......................... G06F 2009/4557; G06F 9/50
See application file for complete search history.

(56) References Cited

U.S. PATENT DOCUMENTS

| | | | |
|---|---|---|---|
| 7,111,145 B1 * | 9/2006 | Chen ..................... | G06F 12/109 703/23 |
| 8,370,559 B2 * | 2/2013 | Schoenberg ........ | G06F 9/45558 711/163 |
| 8,656,482 B1 | 2/2014 | Tosa et al. | |
| 8,892,916 B2 * | 11/2014 | Bieswanger .......... | G06F 1/3203 713/300 |
| 2012/0072669 A1 * | 3/2012 | Nishiguchi ......... | G06F 12/1027 711/135 |
| 2013/0276057 A1 | 10/2013 | Smith et al. | |
| 2014/0013326 A1 | 1/2014 | Neiger et al. | |
| 2014/0082240 A1 * | 3/2014 | Coleman ............... | G06F 9/4812 710/260 |
| 2014/0173628 A1 | 6/2014 | Ramakrishnan Nair | |
| 2014/0283056 A1 | 9/2014 | Bachwani et al. | |
| 2014/0380009 A1 | 12/2014 | Lemay et al. | |

OTHER PUBLICATIONS

"[Patch 01/11] VMX: VMFUNC and #VE Definitions and Detection" 2005. http://www.gossamer-threads.com/lists/xen/devel/361453.
Dontu et al., "Zero-Footprint Guest Memory Introspection from Xen" Aug. 18, 2014, Technical Project Manager, Bitdefender; Principal Engineer, Intel, http://events.linuxfoundation.org/sites/events/files/slides/Zero-Footprint%20Guest%20Memory%20Introspection%20from%20Xen%20_%20draft11.pdf.
Avi Kivity, "[Qemu-Devel] [Patch] KVM: Update VMXCAP for EPT A/D, INVPCID, RDRAND, VM" May 16, 2012, https://lists.gnu.org/archive/html/qemu-devel/2012-05/msg02236.html.

* cited by examiner

*Primary Examiner* — Camquy Truong
(74) *Attorney, Agent, or Firm* — Haynes and Boone, LLP

(57) ABSTRACT

A method performed by a physical computing system includes, with a guest, requesting execution of a virtual machine function instruction, determining that virtual machine function ability for the guest is in a disabled state, in response to the requesting execution of a virtual machine function instruction and determining that the virtual machine function ability for the guest is in a disabled state, exiting a context of the guest, after a page table that maps guest virtual addresses to guest physical addresses is validated, determining that the virtual machine function ability is enabled, and in response to determining that the virtual machine function ability for the guest is in an enabled state, executing the virtual machine function instruction.

20 Claims, 5 Drawing Sheets

DYNAMIC VIRTUAL MACHINE FUNCTION ENABLING

BACKGROUND

The present disclosure relates generally to virtual machine management, and more particularly to virtual machine functions.

A virtual machine is software that is executed on hardware to create a virtualization of a physical computer system. Virtual machines may function as self-contained platforms that run their own operating systems and software applications.

A host machine, such as a server computer may concurrently run one or more virtual machines using software that is referred to as a hypervisor. The hypervisor allocates a certain amount of the host's resources, such as the host's underlying physical processors and memory devices, to each of the virtual machines, allowing the virtual machines to transparently access the host's resources.

Each virtual machine may use the allocated resources to execute applications, including operating systems referred to as guest operating systems. Each virtual machine guest operating system may be accessed by one or more local or remote clients to perform computing tasks.

SUMMARY

According to one example, a method performed by a physical computing system includes, with a guest, requesting execution of a virtual machine function instruction, determining that virtual machine function ability for the guest is in a disabled state, in response to the requesting execution of a virtual machine function instruction and determining that the virtual machine function ability for the guest is in a disabled state, exiting a context of the guest, after a page table that maps guest virtual addresses to guest physical addresses is validated, determining that the virtual machine function ability is enabled, and in response to determining that the virtual machine function ability for the guest is in an enabled state, executing the virtual machine function instruction.

According to one example, a method performed by a computing system includes, while in a context of a guest managed by a hypervisor of the computing system, requesting execution of a first virtual machine function instruction, determining that virtual machine function ability is in a disabled state, exiting the context of the guest in response to detecting the requesting execution of the first virtual machine function instruction while the virtual machine function ability is in the disabled state, while out of the context of the guest, validating a page table that maps guest virtual addresses to guest physical addresses, and after validating the page table, switching the virtual machine function ability to an enabled state.

According to one example, a system includes a processor and a memory comprising machine readable instructions that comprise a hypervisor configured to manage a number of guests, wherein a guest of the number of guests is configured to: request execution of a virtual machine function instruction, determine that virtual machine function ability is in a disabled state, exiting a context of the guest in response to detecting the request for execution of the first virtual machine function instruction while the virtual machine function ability is in the disabled state, after a page table that maps guest virtual addresses to guest physical addresses has been validated, determining that the virtual machine function ability is enabled, and in response to determining that the virtual machine function ability is in an enabled state, executing a virtual machine function instruction.

Figure 1:
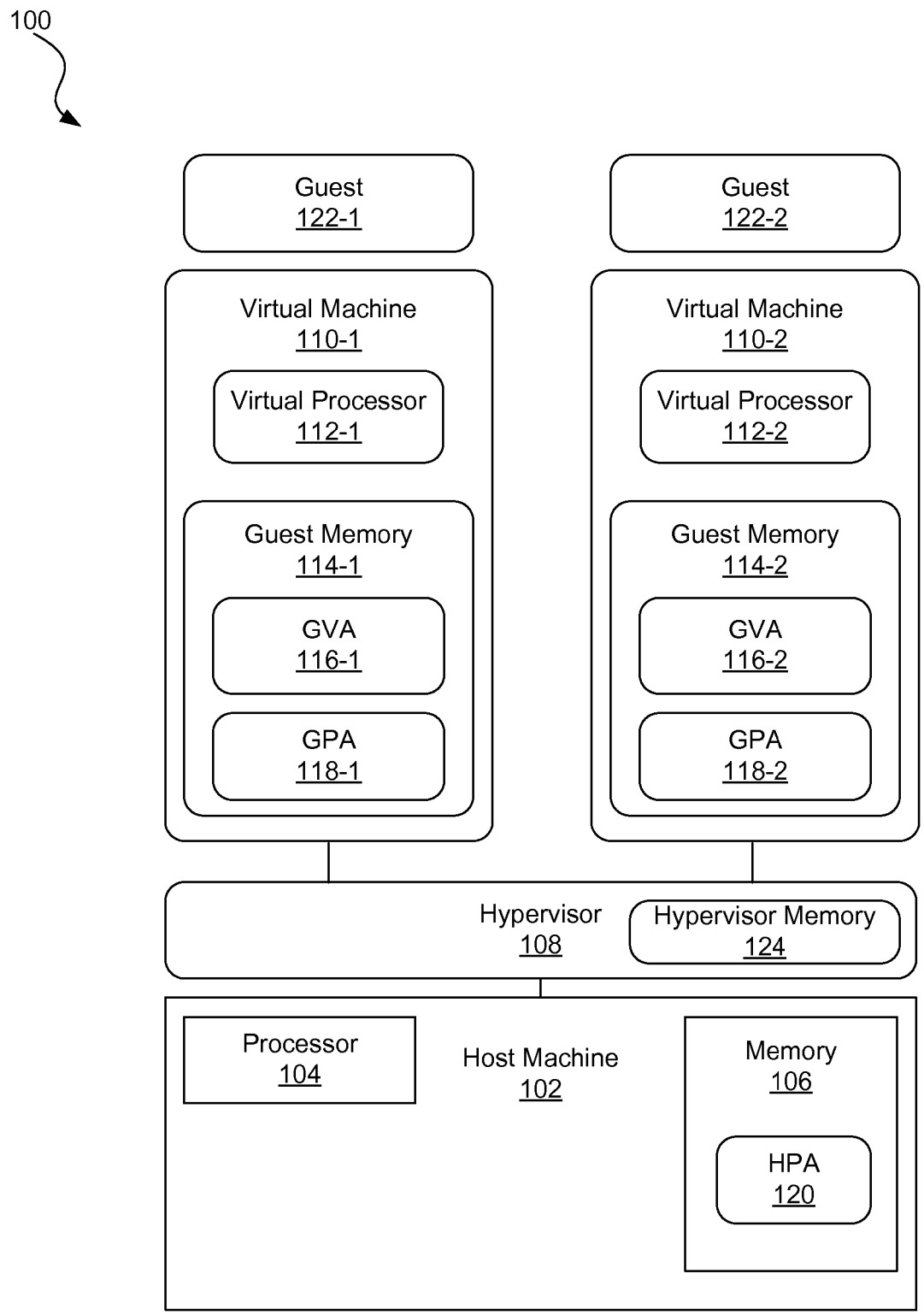
FIG. 1 is a diagram showing illustrative virtual machines running on a host machine, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, a host machine may run several virtual machines. The processor for such a host machine switches to different contexts based on the virtual machine that is currently being executed. For example, when a processor switches to a particular virtual machine, it is referred to as a virtual machine entry. When the processor switches to a different context, such as to that of another virtual machine or to that of the hypervisor, it is referred to as a virtual machine exit. Switching contexts involves some overhead and thus it is desirable to minimize the switching of contexts.

The Instruction Set Architecture (ISA) for some processors includes an instruction referred to as VMFUNC. The VMFUNC instruction can be used to provide a number of useful operations such as allowing communication between different virtual machines or communication between a virtual machine and the hypervisor without causing an exit. This is done by giving the guest running on a virtual machine access to a privileged page of memory. The page may be privileged because it is part of hypervisor memory or guest memory for a different virtual machine. Typically, a guest does not have write access to such pages for security purposes. But, use of the VMFUNC, along with various other security measures, can allow such write access in a secure manner.

An operation that uses the VMFUNC instruction, or similar processor instruction, is referred to as a virtual machine function. For security purposes, a virtual machine function typically relies on the guest page tables that map guest virtual addresses to guest physical addresses to be valid. If a guest has access to the page tables that translate guest virtual addresses into guest physical addresses, and a virtual machine has access to more than one page of privileged memory, then the guest could maliciously or inadvertently corrupt or confuse the virtual machine function. Furthermore, validating the guest page tables involves an exit, which slows down processing.

According to principles described herein, a dynamic technique for validating page tables is used. According to one example, virtual machine function ability is in one of two states. In the first state, virtual machine function ability is disabled and thus execution of the VMFUNC instruction causes an exit. After exiting to the hypervisor, the guest page tables can be validated. After the page tables are validated, the virtual machine function ability is switched to a second state, in which virtual machine function ability is enabled. While the virtual machine function ability is enabled, any page table related modification will cause the virtual machine function ability to switch from the second state to the first state. In other words, any action that occurs that could affect the validation of the page table will cause the virtual machine function ability to be disabled. Such actions may include a modification of a page table entry or a modification of the page table base register, which in some examples is control register 3 (cr3). The page table base register is a register that stores a pointer to the page table. Through use of principles described herein, a virtual machine can safely provide a guest with access to multiple page tables while reducing the number of exits. This allows the host machine to operate more efficiently.

FIG. 1 is a diagram showing illustrative system 100 of virtual machines 110 running on a host machine 102. According to the present example, a physical system, such as a host machine 102 uses a hypervisor 108 to manage multiple virtual machines 110. Each of the virtual machines 110 provides virtual resources, such as a virtual processor 112 and virtual memory (guest memory) 114 to a guest operating system 122.

The host machine 102 includes hardware such as a processor 104 for executing software (e.g., machine readable instructions) and using or updating data stored in memory 106. The processor 104 may represent one or more processors acting in concert. The memory 106 may be one or more of many different types of memory. Some types of memory, such as solid state drives typically have relatively larger storage volume but relatively slower performance. Other types of memory, such as those used for Random Access Memory (RAM), are optimized for speed and are often referred to as "working memory." The various types of memory may store information in the form of software and data. The software may include an operating system, a hypervisor 108 and various other software applications.

The memory 106 may be divided into units referred to as pages. A page is a specified amount of contiguous memory that represents the smallest unit in which an operating system allocates for various purposes. A page of memory is a set range of addresses to which data can be stored. The operating system may swap pages from working memory to longer term storage such as a non-volatile storage. The pages in host memory correspond to Host Physical Addresses (HPAs) 120. The HPAs 120 may be allocated for use by the host machine 102, the hypervisor 108, or one of the virtual machines 110.

The hypervisor 108 supports a first virtual machine 110-1 having a first virtual processor 112-1 and guest memory 114-1. The hypervisor 108 also supports a second virtual machine 110-2 having a second virtual processor 112-2 and guest memory 114-2. Although two virtual machines 110 are illustrated, other examples include fewer than two virtual machines or more than two virtual machines.

The hypervisor 108 is provided with some memory referred to as hypervisor memory 124. Hypervisor memory 124 corresponds to physical pages in host memory 106. Thus, a subset of the pages in host memory 206 is allocated for use by the hypervisor. The hypervisor 108 can use this memory to perform various tasks related to management of the virtual machines 110.

In the present example, virtual machines 110 are platforms on which operating systems referred to as guest operating systems 122 run. The guest operating systems 122 may be referred to as "guests." A guest 122-1 running on the first virtual machine 110-1 may be a different operating system than another guest 122-2 running on the second virtual machine 110-2. Guests 122 may also be different operating systems than the operating system running on host machine 102.

The hypervisor 108 manages the host machine 102 resources and makes them available to one or more guests 122 that may be alternately or concurrently executed by the host machine 102. Hypervisor 108 may manage hardware resources and arbitrates requests of the multiple guests. For example, the hypervisor 108 may present a virtual set of CPU, memory, I/O, and disk resources to each guest based on the physical hardware and/or based on a standard and consistent selection of custom hardware. A virtual machine 110 is provided its own address space in memory, its own processor resource allocation, and its own device input/output (I/O) using its own virtual device drivers.

In the present example, the hypervisor 108 provides a virtual machine 110, which is an underlying emulation of host machine 102, to a guest 122. A virtual machine 110 can be, for example, a hardware emulation, full virtualization, para-virtualization, and operating system-level virtualization virtual machine. The term virtual machine generally refers to part of a host system that is visible to a guest 122. A virtual machine 110 may include, for example, virtual CPUs 112, one or more virtual devices such as an emulated NIC or disk, physical devices over which a guest 122 is given partial or full control, virtual firmware such as a Basic Input/Output System (BIOS) and/or an Extensible Firmware Interface (EFI), an Advanced Configuration and Power Interface (ACPI), virtual memory 114 (e.g., guest memory), and so forth.

In the present example, a guest 122 manages resources of the virtual machine 110. The term "guest" refers to the computer readable instructions run on a hypervisor 108 that is installed on a disk, loaded into memory, or currently running. A guest 122 may include, for example, a copy of firmware in memory, an operating system, additional installed software, a browser, applications running in a browser, and so forth. In one example, a virtual machine 110 running on a host machine 102 may run the same or a different guest operating system as the host operating system 114. Some examples of types of operating systems that may be run include LINUX, UNIX, OS X, WINDOWS, and so forth.

The guest memory 114 is represented by Guest Virtual Addresses (GVA) and Guest Physical Addresses (GPAs). The hypervisor 108 maps HPAs 120 to GPAs 118. Specifically, a page of host memory is mapped to a page of guest memory 114 identified by GPAs 118. A page table is used to maintain this mapping. Each entry in the page table provides a mapping from a GPA 118 to an HPA 120. Similarly, the guest maps pages identified by GVAs 116 to pages of GPAs 118. A page table is also used for such a mapping. The GVAs 116 are provided to various applications that run on the guest 122.

The hypervisor 108 provides sets of access privileges, referred to as "views," which define a virtual machine's privileges to the different pages. These views may define execution access, write access, and read access. A guest 122 is typically not given access to pages other than those associated with the GPA pages of the corresponding virtual machine 110. For example, a guest 122 is not given access to pages in host memory 106 that are mapped to hypervisor memory 124 or GPAs 118 of a different virtual machine. For example, virtual machine 110-1 has access to HPAs 120 that are mapped to GPAs 118-1, but not HPAs 120 that are mapped to GPAs 118-2. This is because GPAs 118-2 are associated with a different virtual machine 110-2.

But, as described above, it can be useful to give a virtual machine 110 and its respective guest 122 access to a page of memory to which it would not otherwise have access. Such access can allow the virtual machine to send information to either another virtual machine or to the hypervisor without a virtual machine exit. Thus, the VMFUNC instruction provides a guest with different views, which allow access to a virtual machine function that executes a segment of trusted code. The trusted code can perform various write operations to privileged pages (i.e., pages of hypervisor memory or guest memory for a different guest).

Figure 2:
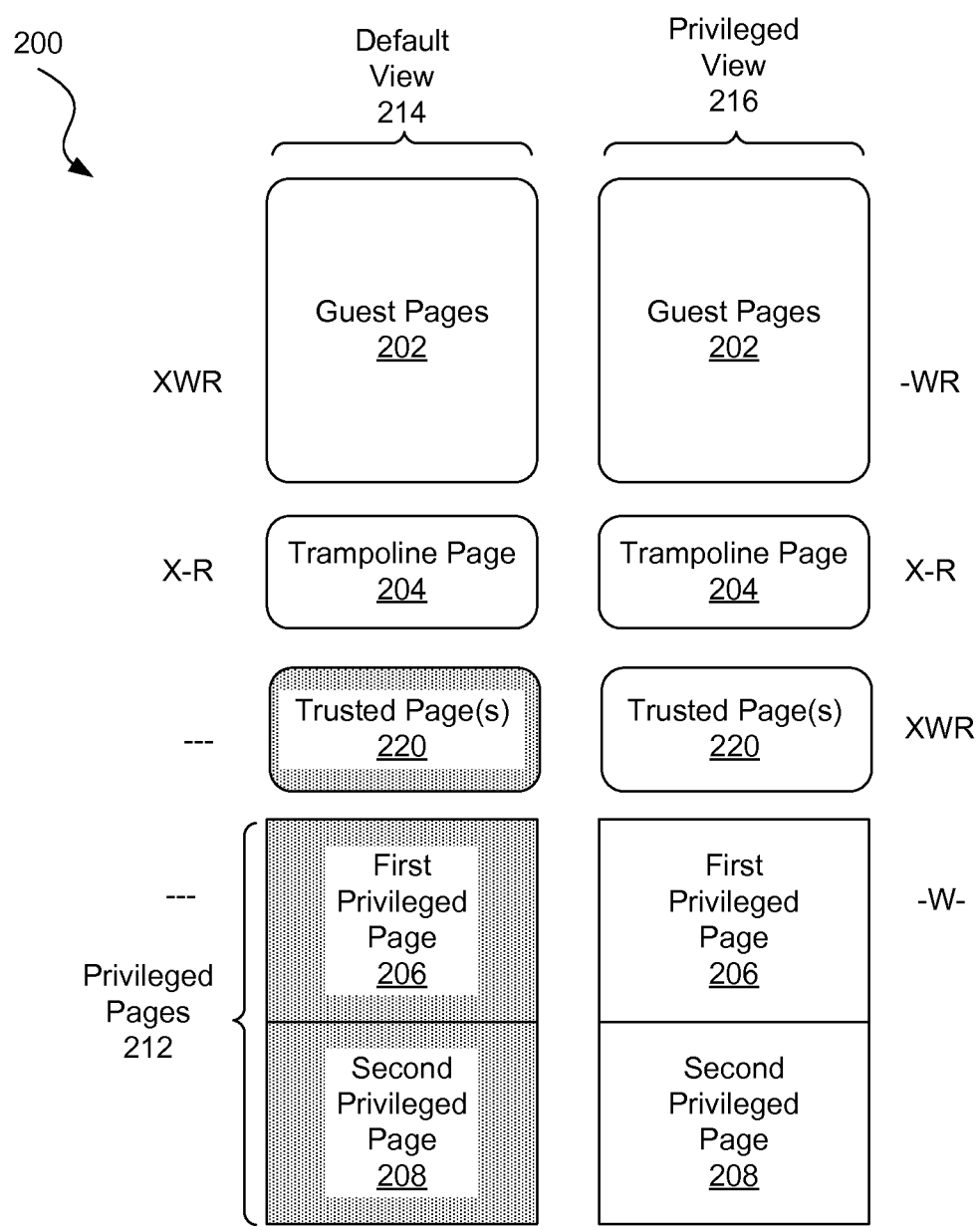
FIG. 2 is a diagram showing various page views associated with a virtual machine function, according to one example of principles described herein.

FIG. 2 is a diagram 200 showing various page views 214, 216 associated with a virtual machine function. According to the present example, the pages within host memory (e.g., 106, FIG. 1) from the perspective of a particular guest (e.g., 122-1, FIG. 1) are divided up into guest pages 202, a trampoline page 204, a trusted page 220, and privileged pages 212.

The guest pages 202 correspond to pages of guest memory (e.g. 114, FIG. 1) that have been allocated for use by the guest. The guest pages 202 may store code associated with applications run by the guest system. The guest pages 202 may also store data associated with those applications.

The trampoline page 204 typically has different access privileges than the guest pages 202. Specifically, the guest does not have write access to the trampoline page 204. The trampoline page is typically where the VMFUNC instruction is stored. For example, a method stored within the guest pages 202 may include an instruction to jump to code within the trampoline page. The VMFUNC instruction stored in the trampoline page is then executed. Then, the trampoline code includes instructions to call a method that is stored within the trusted page 220. The trusted code page 220 is a page that the guest only has access through use of the virtual machine function instructions. The trusted page 220 may include the instructions to copy data from the guest pages 202 to the privileged pages 212 or to copy data from the privileged pages 212 to the guest pages 202. In some examples, there may be multiple trusted pages 220.

The privileged pages 212 correspond to portions of memory to which the guest does not typically have access. A privileged page 212 may be a portion of hypervisor memory. Alternatively, a privileged page 212 may be a portion of guest memory for a different guest. The privileged pages 212 include a first privileged page 206 and a second privileged page 208, and all other privileged pages 210.

The default view 214 represents the normal view provided to the guest. In this view, access to all privileged pages 212 and the trusted pages 220 is disabled. In the default view 214, the guest may have full access to the guest pages 202. Specifically, the guest has execute access to the guest pages 202, which gives the guest the ability to execute code stored within those pages. The guest also has read access to the guest pages 202, which gives the guest the ability to read data stored in the guest pages. The guest also has write access to the guest pages 202, which gives the guest the ability to write data to the guest pages.

According to principles described herein, a particular virtual machine function instruction will provide the guest with a different view, particularly, the privileged view 216. With the privileged view 216, the guest has write access to the privileged pages, including both the first privileged page 206 and the second privileged page. Write access to all other privileged pages remains disabled. In the privileged view 216, the guest has execution access to the trusted code pages 220.

Figure 3:
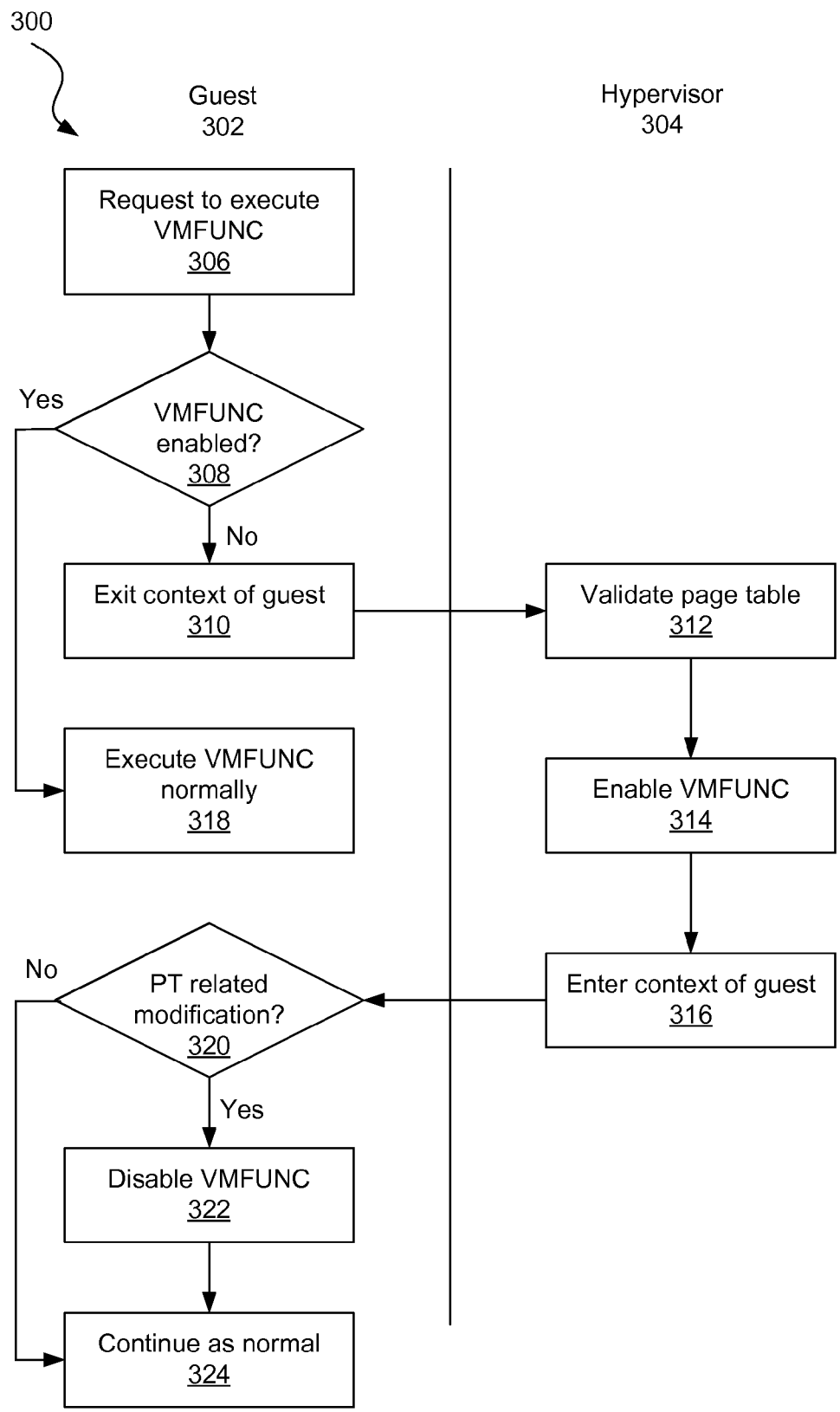
FIG. 3 is a flowchart showing an illustrative method for dynamic enabling of virtual machine function ability, according to one example of principles described herein.

FIG. 3 is a flowchart showing an illustrative method 300 for dynamic enabling of virtual machine function ability. According to the present example, some steps are performed by a guest 302 and some steps are performed by a hypervisor 304. At step 306, the guest 302 requests execution of the VMFUNC instruction. For example, a method stored within the guest pages may include an instruction to jump to the trampoline page, where the VMFUNC instruction resides.

At step 308, it is determined whether virtual machine function ability is enabled. Various mechanisms may be used to enable or disable virtual machine function ability. For example, data stored within the Virtual Machine Control Structure (VMCS) may indicate whether virtual machine function ability is enabled. The VMCS is a data structure stored in memory. The VMCS includes data that defines the state of a virtual processor. Thus, when the hypervisor switches to a new virtual machine, it can use the VMCS for that virtual machine to restore the state of that virtual processor.

If it is determined that the virtual machine function ability is enabled, then the virtual processor will execute the virtual machine function instruction as normal at step 318. But, if the virtual machine function ability is disabled, then the processor of the host machine exits the context of the guest 302 at step 310. Then, the processor enters the context of the hypervisor 304.

At step 312, while in the context of the hypervisor 304, the page table that maps guest virtual addresses to guest physical addresses is validated. Various mechanisms may be used to validate the guest page table, which is sometimes referred to as an Extended Page Table (EPT). The guest page table is validated to ensure that guest virtual addresses are mapped to the proper guest physical addresses. This includes the proper ordering of the page tables such that when finishing execution of instructions on one page, the next page from which instructions are fetched is the correct page. An error or manipulation of the page table can allow for code that is unintended for execution to be executed.

After the page table has been validated, the virtual machine function ability is enabled at step 314. This may be done, for example, by changing the appropriate information within the VMCS. As will be described in further detail below, there may be other conditions that determine whether virtual machine function ability should be enabled. In some examples, the hypervisor 304 may perform other tasks before re-entering the context of the guest at step 316. After entering the context of the guest, the guest may continue to execute code as normal.

The method 300 further includes, while the virtual machine function ability is enabled, determining whether a page table related modification has occurred. Such a page table related modification may be, for example, a change to an entry of the page table. While such changes may be part of the normal operation of the guest, it is possible that such a change effectively reorders pages so that malicious code is executed while the guest has access to privileged pages, or that privileged access is granted for the wrong pages. Another page table related modification may be, for example, a change to control register 3 (cr3). For example, an instruction such as MOV CR3, [DATA] will copy data into the cr3 register. Because the cr3 register stores data related to the page table, a change to such a register can be used for malicious purposes. In response to such page table related modifications, the page table should be validated before virtual machine function ability is allowed again.

Accordingly, the method 300 further includes a step 322 for disabling the virtual machine function ability in response to detecting a page table related modification. But, if no page table related modification occurs, then the method 300 continues execution as normal in step 324.

Using the technique described above, the virtual machine function ability is enabled for as long as the page table is known to be valid. If a change occurs to the page table, then the virtual machine function ability is disabled. Thus, every change to the page table does not cause a virtual machine exit to validate the page table. For example, there may be several changes made to the page table while in the context of the guest. Only when the VMFUNC instruction is requested, as in step 306, will it cause an exit to the hypervisor to determine whether VMFUNC should be enabled.

Figure 4:
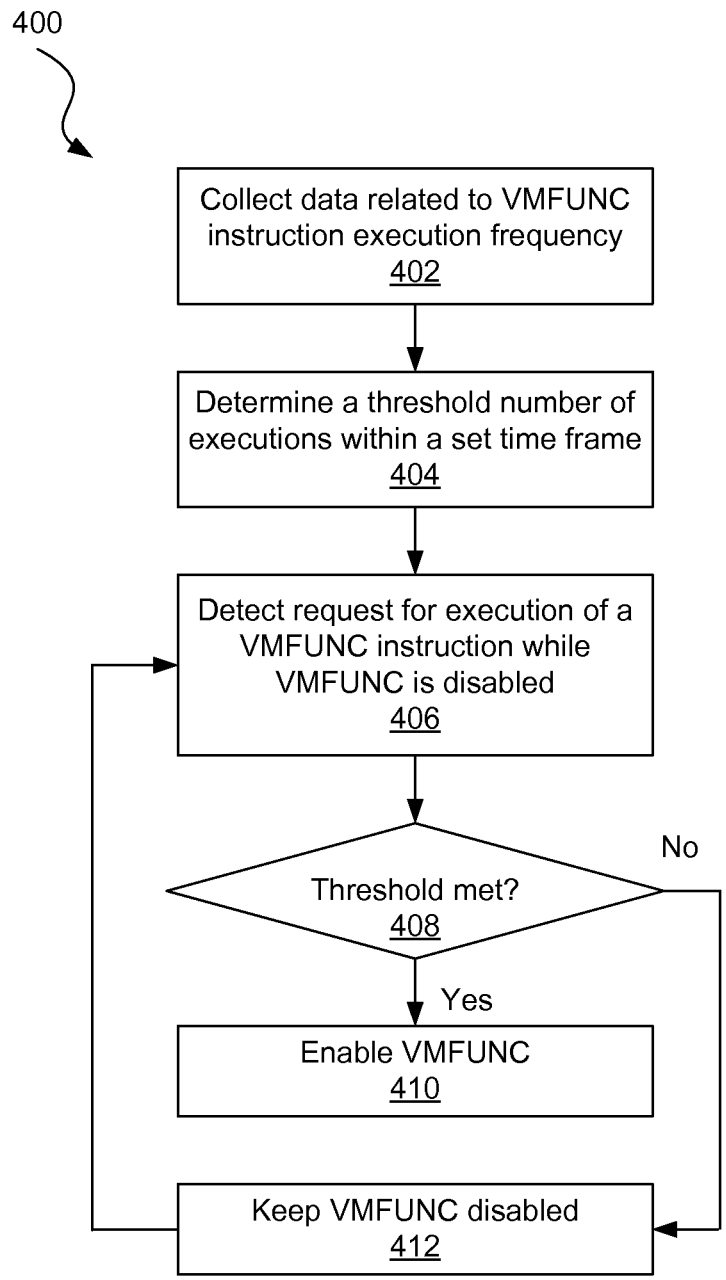
FIG. 4 is a flowchart showing an illustrative method for determining when to enable virtual machine function ability, according to one example of principles described herein.

FIG. 4 is a flowchart showing an illustrative method for determining when to enable virtual machine function ability. In some examples, it may not be worth validating the page table every time a VMFUNC instruction is executed while the virtual machine function ability is disabled. According to the present example, the method 400 includes a step 402 for collecting data related to the frequency at which the VMFUNC instruction is executed.

The method 400 further includes a step 404 for determining a threshold number of executions of the VMFUNC instruction within a set time frame. For example, the threshold may be 200 executions within 500 microseconds. Based on the historical data, it may be determined that a set number of VMFUNC instructions executed within a specific time frame indicates that it is likely that several more VMFUNC instructions will soon be executed. In such a case, it may be worth the overhead involved with validating the page table and enabling VMFUNC so that each execution of VMFUNC no longer causes an exit to the hypervisor. Determination of the threshold can take into account the overhead of context switching in response to execution of the VMFUNC while VMFUNC is disabled.

The method 400 further includes a step 406 for detection a request for execution of a VMFUNC instruction while virtual machine function ability is disabled. As described above, this causes an exit to the hypervisor. The hypervisor then determines whether or not virtual machine function ability should be enabled.

At step 408, it is determined whether the threshold has been met. In other words, it is determined whether a pre-determined number of VMFUNC instruction executions have been executed within the past set period of time. If it is determined that the threshold has not been met, then the method 400 proceeds to step 412 at which the virtual machine function ability is kept disabled. The hypervisor can then handle the situation accordingly and the context switches back to the context of the guest.

If, however, it is determined that the threshold has been met, then the method 400 proceeds to step 410, at which the virtual machine function ability is enabled. While enabling the virtual machine function ability involves validating the page table first, this overhead may be worth it because it is expected that several VMFUNC instructions will be executed in the near future, and if the virtual machine function ability is enabled, then those instructions will not cause an exit to the hypervisor.

Figure 5:
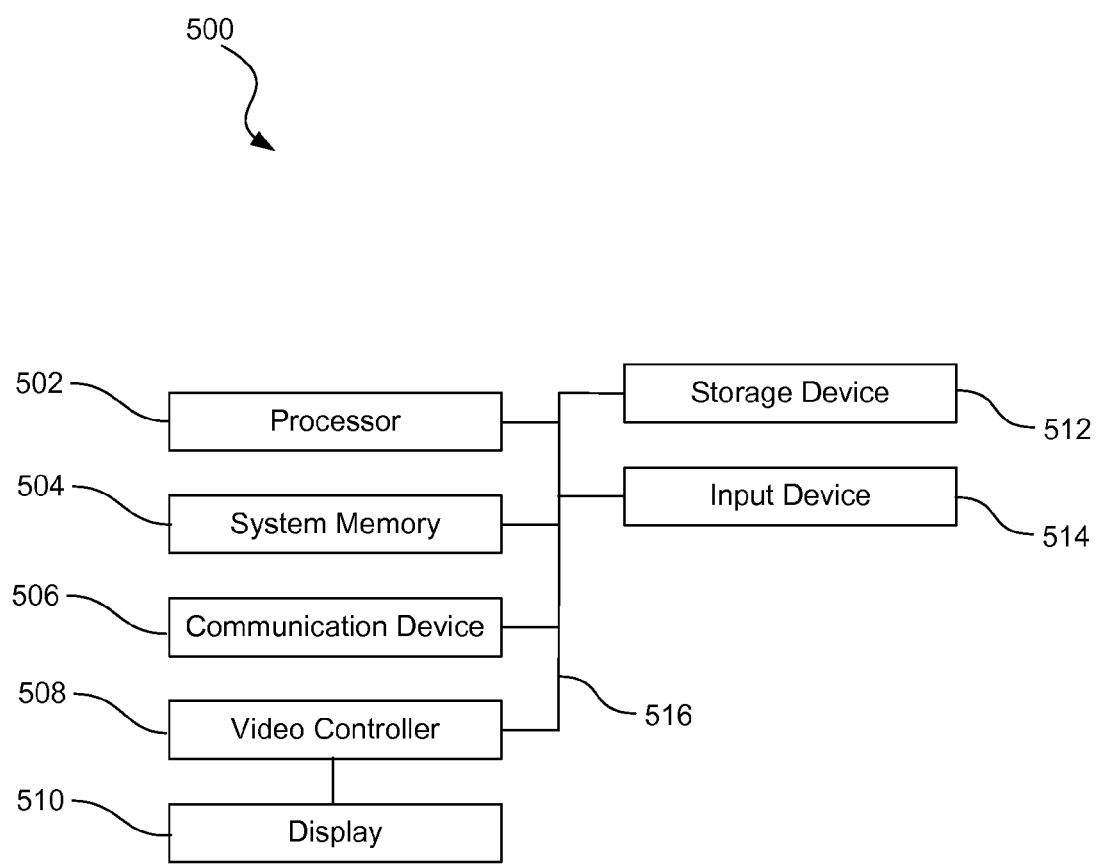
FIG. 5 is a diagram showing an illustrative computing system that can host virtual machines, according to one example of principles described herein.

FIG. 5 is a diagram of an illustrative computing system that may run several virtual machines and a hypervisor with functionality described herein. For example, the computing system 500 may include components of a server system that implements the methods 300 and 400 described above.

According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smart-phones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a physical computing system, the method comprising:
   with a guest, requesting execution of a virtual machine function instruction, the virtual machine function instruction allowing the guest to access a protected portion of memory without exiting a context of the guest;
   determining that virtual machine function ability for the guest is in a disabled state;
   in response to the requesting execution of a virtual machine function instruction and determining that the virtual machine function ability for the guest is in a disabled state, exiting the context of the guest;
   after a page table that maps guest virtual addresses to guest physical addresses is validated, determining that the virtual machine function ability is enabled; and
   in response to determining that the virtual machine function ability for the guest is in an enabled state, executing the virtual machine function instruction.

2. The method of claim 1, further comprising, with a hypervisor, in response to the exiting the context of the guest, validating the page table; and
   after validating the page table, switching the virtual machine function ability for the guest to the enabled state.

3. The method of claim 2, wherein the switching the virtual machine function ability to the enabled state is in response to detecting a threshold number of virtual machine function instructions within a predefined period of time.

4. The method of claim 3, wherein validating the page table comprises determining that the page table correctly maps guest virtual addresses to guest physical addresses.

5. The method of claim 1, further comprising, in response to determining that a page table related modification has occurred while the virtual machine function ability is in the enabled state, switching the virtual machine function ability to the disabled state.

6. The method of claim 5, wherein the page table related modification comprises changing a value stored in a page table base register.

7. The method of claim 5, wherein the page table related modification comprises changing an entry within the page table.

8. The method of claim 1, wherein the virtual machine function instruction provides access to privileged pages without a virtual machine exit.

9. A method performed by a computing system, the method comprising:
   while in a context of a guest managed by a hypervisor of the computing system, requesting execution of a first VMFUNC instruction;
   determining that VMFUNC ability is in a disabled state;
   exiting the context of the guest in response to detecting the requesting execution of the first VMFUNC instruction while the VMFUNC ability is in the disabled state;

while out of the context of the guest, validating a page table that maps guest virtual addresses to guest physical addresses; and after validating the page table, switching the VMFUNC ability to an enabled state.

10. The method of claim 9, further comprising, with VMFUNC ability in the enabled state, disabling VMFUNC ability in response to detecting a page table related modification.

11. The method of claim 10, wherein the page table related modification comprises a change to a value stored in a page table base register.

12. The method of claim 10, wherein the page table related modification comprises a change to an entry within the page table.

13. The method of claim 9, wherein the switching the VMFUNC ability to the enabled state is in response to detecting a threshold number of VMFUNC on calls within a predefined time limit.

14. The method of claim 13, wherein the threshold is based on historical data.

15. The method of claim 9, wherein validating the page table is performed while in a context of the hypervisor.

16. The method of claim 9, wherein validating the page table comprises determining that the page table correctly maps guest virtual addresses to guest physical addresses.

17. A system comprising:
a processor; and
memory comprising machine readable instructions that comprise a hypervisor configured to manage a number of guests, wherein a guest of the number of guests is configured to:

request execution of a virtual machine function instruction, the virtual machine function instruction allowing the guest to access a protected portion of memory without exiting a context of the guest;

determine that virtual machine function ability is in a disabled state;

exiting a context of the guest in response to detecting the request for execution of the first virtual machine function instruction while the virtual machine function ability is in the disabled state;

after a page table that maps guest virtual addresses to guest physical addresses has been validated, determining that the virtual machine function ability is enabled; and in response to determining that the virtual machine function ability is in an enabled state, executing a virtual machine function instruction.

18. The system of claim 17, wherein the hypervisor is configured to, in response to the exiting the context of the guest, validating a page table that maps guest virtual addresses to guest physical addresses.

19. The system of claim 18, wherein the hypervisor is configured to switch the virtual machine function ability for the guest to the enabled state after validating the page table.

20. The system of claim 19, wherein to switch the virtual machine function ability to the enabled state is in response to detecting a threshold number of virtual machine function calls within a predefined time limit.

* * * * *